United States Patent [19]

Hoffmann et al.

[11] 4,271,461
[45] Jun. 2, 1981

[54] CLOCK-CONTROLLED DC CONVERTER

[75] Inventors: Kurt Hoffmann, Taufkirchen; Karl Zapf, Munich, both of Fed. Rep. of Germany

[73] Assignee: Siemens Aktiengesellschaft, Berlin & Munich, Fed. Rep. of Germany

[21] Appl. No.: 36,070

[22] Filed: May 4, 1979

[30] Foreign Application Priority Data

May 16, 1978 [DE] Fed. Rep. of Germany ....... 2821418

[51] Int. Cl.³ .......................................... H02P 13/22
[52] U.S. Cl. ...................................... 363/60; 307/297
[58] Field of Search ........................... 363/59, 60, 61; 307/279, 296, 297, 303, 304, 109, 110; 357/41, 51

[56] References Cited

U.S. PATENT DOCUMENTS

| 3,742,260 | 6/1973 | Boudry | 363/60 |
| 3,942,047 | 3/1976 | Buchanan | 307/303 |
| 3,975,671 | 8/1976 | Stoll | 363/60 |
| 4,016,476 | 4/1977 | Morokawa et al. | 363/59 |
| 4,047,091 | 9/1977 | Hutchines et al. | 363/59 |

FOREIGN PATENT DOCUMENTS 2632199 1/1978 Fed. Rep. of Germany.

Primary Examiner—William M. Shoop
Assistant Examiner—Peter S. Wong
Attorney, Agent, or Firm—Hill, Van Santen, Steadman, Chiara & Simpson

[57] ABSTRACT

A clock-controlled dc converter is provided in integrated semiconductor MOS technology and serves the supply voltage of integrated MOS circuits, particularly dynamic memories. The converter comprises a clock pulse generator having two outputs, supplying sequences of clock pulses which are inverted with respect to one another, which pulses are connected to the two clock pulse inputs of a first pulse level shifter. The first pulse level shifter comprises a bistable flip-flop lying at a supply potential, and which is switched as a level shifter. The two outputs of the first level shifter are connected, on the one hand, to the output of a voltage converter by way of the source-drain circuit of a respective field effect transistor. On the other hand, the two outputs are connected to the supply input of a respective pulse voltage doubler, which are in turn directly charged by a respective output of the clock pulse generator. The two pulse voltage doublers supply the clock pulse supply for a second pulse level shifter, likewise constructed as a bistable flip-flop, by way of the two outputs of which the connection between the outputs of the first level shifter and the output of the voltage comparator is controlled. The doubled supply voltage appears at the output of the voltage converter.

33 Claims, 10 Drawing Figures

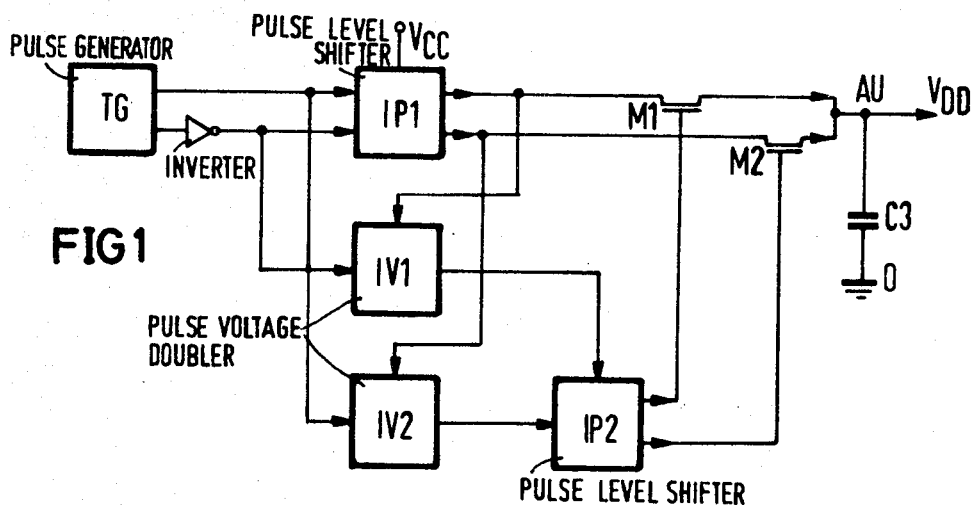

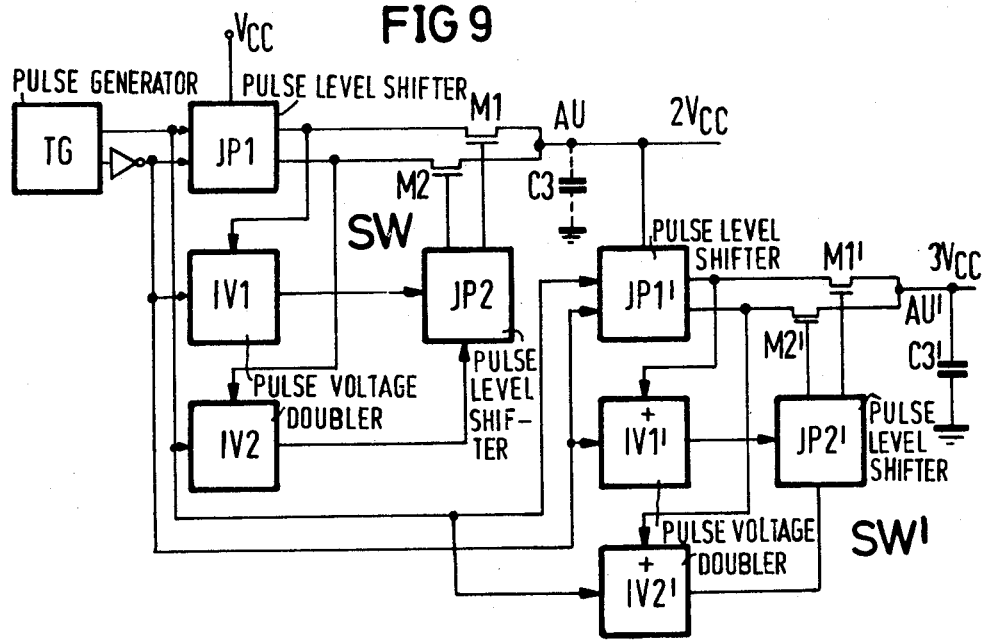
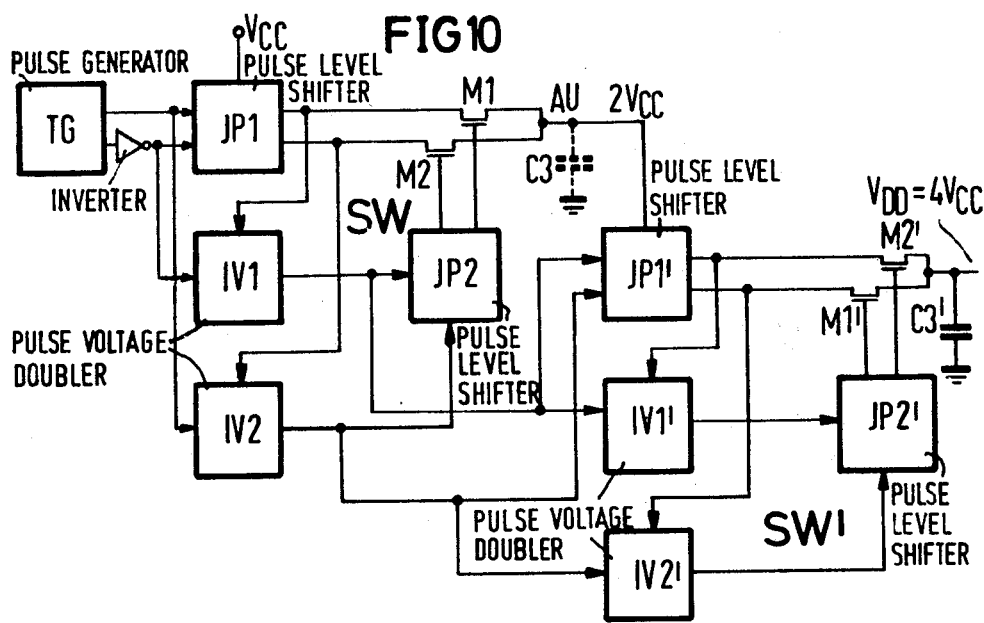

4,271,461

CLOCK-CONTROLLED DC CONVERTER

BACKGROUND OF THE INVENTION

1. Field of the Invention

The present invention relates to a clock-controlled dc converter comprising metal-oxide-semiconductor (MOS) field effect transistors and capacitors, in which a bistable flip-flop formed of two cross-coupled field effect transistors is applied with the drains of its field effect transistors to a fixed potential and with its sources to a respective sequence combination of field effect transistors and capacitors effecting the connection with the zero potential. More specifically, the two sequence combinations are identical to one another and, moreover, the sources of their two cross-coupled field effect transistors forming the two outputs of the bistable flip-flop are connected by way of a respective capacitor and a respective output of a clock pulse generator supplying two series of clock pulses which are inverted with respect to one another. The drain of the one of the two cross-coupled field effect transistors of the bistable flip-flop is directly connected with the drain of an identical, further field effect transistor assigned thereto and its source is directly connected with the source of an identical, further field effect transistor assigned thereto.

2. Description of the Prior Art

The German published application No. 2,632,199 discloses an arrangement for voltage multiplication. The significant advantage of the arrangement described therein is that the same can be usually integrated and a voltage multiplication can be achieved with the assistance of only two clock pulses.

This is also the case in a dc converter constructed in accordance with the present invention.

In the known arrangement, however, the disadvantage arises in that an exact multiple, for example, twice, the given direct voltage does not appear at its output, but rather only a direct voltage which is reduced by an amount with respect to the desired multiple which is determined by the properties of the respective realization of the circuit. This disadvantage is to be eliminated by the present invention.

SUMMARY OF THE INVENTION

It is therefore the primary object of the invention to provide a dc converter, of the type initially discussed, in which the drain, also, of the second of the two cross-coupled field effect transistors of a bistable flip-flop is conductively connected with the drain, and its source is conductively connected with the source of a further field effect transistor assigned to this field effect transistor. Moreover, the control electrodes of the two additional field effect transistors are directly connected to a supply voltage and, in this manner, the bistable flip-flop is augmented into a first pulse level shifter. In addition, the outputs of the first pulse level shifter, provided by means of the outputs of the bistable flip-flop, are applied, on the one hand, to the output of a dc converter by way of a field effect transistor which serves as a switch, and, on the other hand, to the supply input of the respective clock-controlled pulse voltage doubler. Further, the two pulse voltage doublers are connected, respectively, to one of the two clock pulse inputs of the second pulse level shifter with their outputs supplying the clock pulses with doubled voltage. Finally, the second pulse level shifter, likewise containing a bistable flip-flop, is connected with a respective output of the control electrode of respectively one of the two field effect transistors lying between the outputs of the first pulse level shifter and the output of the dc converter and a respective output of the clock pulse generator controlling the first pulse level shifter appertaining for supplying the two pulse voltage doublers with clock pulses.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block circuit diagram of a voltage converter serving for the generation of a predetermined voltage;

FIG. 2 illustrates a detailed circuit diagram of the apparatus of FIG. 1;

FIG. 3 illustrates a first additional embodiment of the invention;

FIG. 9 is a schematic illustration for generating three times the supply voltage; and FIG. 10 is a schematic circuit diagram illustrating a circuit for generating four times the supply voltage.

DESCRIPTION OF THE PREFERRED EMBODIMENTS

Figure 4:
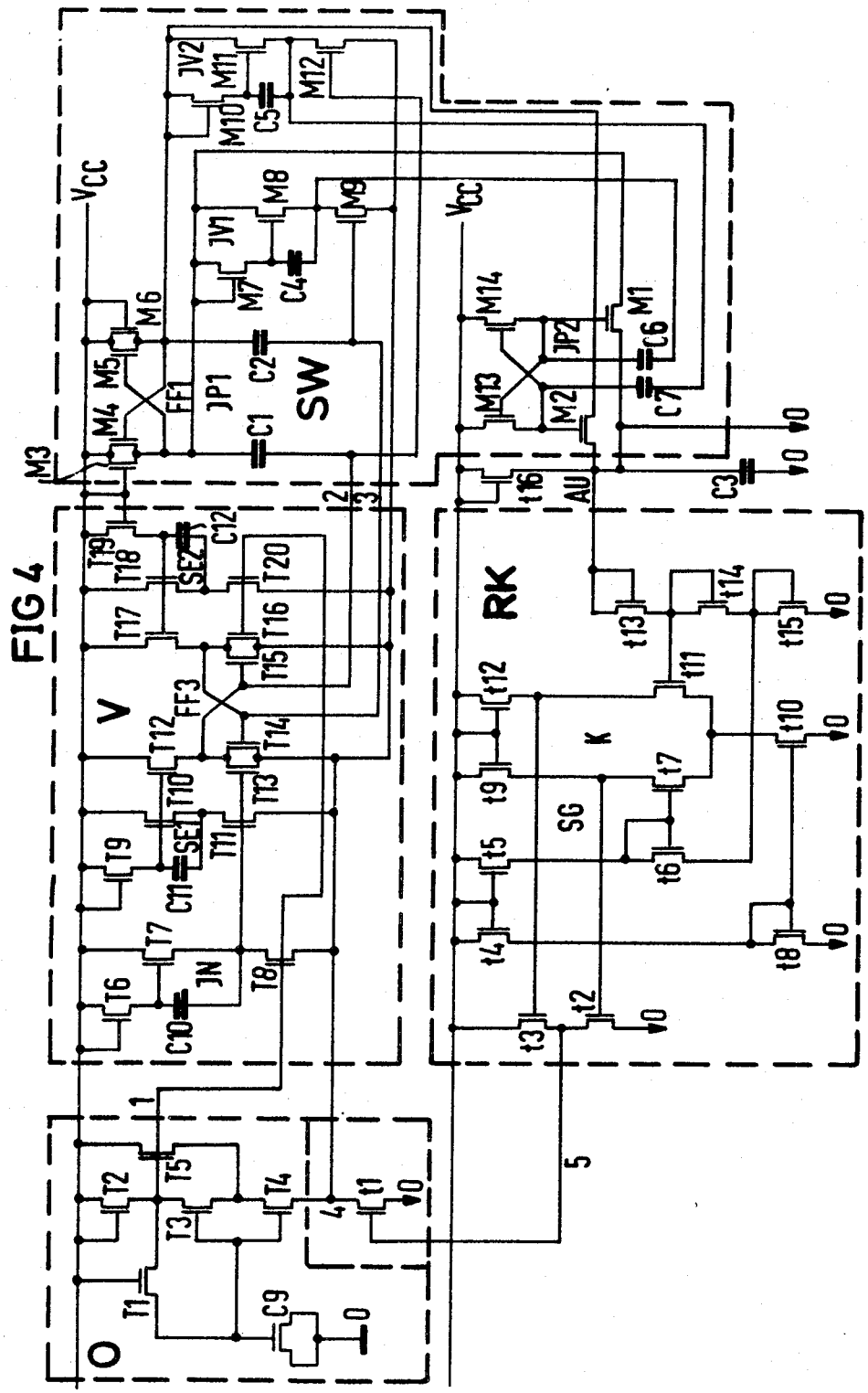
FIG. 4 is a schematic circuit diagram of a circuit constructed in accordance with the present invention.

Referring to the block diagram of FIG. 1, a first sequence of digital clock pulses is made available at an output of a clock pulse generator TG and a second sequence of such clock pulses is made available at the other output, which second sequence is synchronous with and inverted with respect to the first sequence. Upon construction in integrated circuit (IC) technology, in general, one will also integrate the clock pulse unit or clock pulse generator TG on a common semiconductor chip together with the remaining components of the converter, as well as the integrated circuit to be supplied. This means that both the clock pulse generator TG, as well as the integrated circuit connected to the output AU of the voltage converter, and to be supplied by means of the voltage converter, can be realized in MOS-IC technology and that the manufacturer of the total arrangement can be considered simplified in this manner.

The voltage converter itself contains a first pulse level shifter IP1, a second pulse level shifter IP2, as well as the two pulse voltage doublers IV1 and IV2 which are identical to one another. The one clock pulse output of the clock pulse generator TG is applied to the one input of the first pulse level shifter IP1 and to the clock pulse input of the first pulse voltage doubler IV1, the other clock pulse output of the clock pulse generator is applied to the other input of the first pulse level shifter IP1 and the clock pulse input of the second pulse voltage doubler IV2. The outputs of the two pulse voltage doublers IV1 and IV2 are respectively connected to an input of the second pulse level shifter IP2.

The supply inputs of the two pulse voltage doublers IV1 and IV2 are charged by means of the two outputs of the first pulse level shifter IP1. Thereby, the supply input of the pulse voltage doubler IV2, clocked by means of the first sequence of the clock pulses, lies at that output of the first pulse level shifter IP1 which corresponds to the input of the first pulse level shifter IP1 which is controlled with the second sequence of clock pulses. On the other hand, the supply input of the pulse voltage doubler IV1, charged by means of the second series of clock pulses, inverted with respect to the first clock pulse sequence, is applied to that output of the first pulse level shifter IP1 which corresponds to the clock pulse input of the first pulse level shifter IP1 which is charged by means of the first sequence of clock pulses.

The two outputs of the first pulse level shifter IP1 lie at the source of a respective field effect transistor M1 or, respectively, M2 of the enhancement type, whereas the drains of the two field effect transistors M1, M2 are connected, in common, with the output AU of the voltage converter. The control electrodes of the two field effect transistors M1 and M2 are charged by means of a respective output of the second pulse level shifter IP2. Thereby, the following assignment is undertaken:

The transistor M1 connecting the output AU of the voltage converter with the output of the first level shifter IP1 which corresponds to the input of the circuit IP1 clocked by means of the first sequence of clock pulses is applied by way of its control electrode to that output of the second pulse level shifter IP2 which corresponds to the clock input of the second pulse level shifter IP2 which is charged by means of the second pulse voltage doubler IV2.

In an analogous manner, the transistor M2 which connects the other output of the first pulse level shifter IP1 to the output AU is controlled by way of the pulse voltage doubler IV1 and the output of the clock pulse generator TG which supplies the first sequence of clock pulses.

A preferred construction is illustrated in FIG. 2. This construction has the advantage that it exclusively employs field effect transistors of the enhancement type which are either all of the n-channel type or all of the p-channel type. The capacitors C1–C6 provided therein are expediently and advantageously likewise realized in MOS technology. This structure is provided in a known manner in that one either exploits the capacitance between the control electrode and the source and/or drain of a field effect transistor, or in that one produces special so-called MOS diodes which consist of a doped area of the semiconductor crystal employed, particularly silicon crystal, and a capacitor electrode applied over this area on an SiO$_2$ layer covering such area.

Corresponding to the above definition, the first pulse level shifter IP1 contains the four (identical) field effect transistors M3–M6 and the two capacitors C1 and C2. These are connected, corresponding to FIGS. 2, 4 and 7, as set forth below.

The two transistors M3 and M4 form a first transistor pair whose sources and whose drains are respectively connected with one another, whose drains are connected to the supply voltage V$_{CC}$ and whose sources represent both a clock pulse input and an output of the first pulse level shifter IP1. The control electrode of the first of these transistors, namely that of the transistor M3, likewise is connected to the supply potential V$_{CC}$, the control electrode of the second transistor M4 is connected to the sources of the two field effect transistors M5 and M6 forming a second transistor pair of the first pulse level shifter IP1. The second transistor pair M5, M6 corresponds to the first transistor pair M3, M4 with respect to the particular electrode connections. Accordingly, the drains of both transistors and the control electrode of the one transistor, namely that of the transistor M6, are connected to the supply potential V$_{CC}$, the control electrode of the other transistor M5 is connected to the sources of the first transistor pair M3 and M4. The sources of the second transistor pair M5, M6 form a second output and the second clock pulse input of the first pulse level shifter IP1. The transistors M4 and M5, cross-coupled as a result of the circuit described above, form a bistable flip-flop FF1; the parallel transistors M3 and M4 serve in order to provide the first pulse level shifter with a defined output position.

According to the definition of the invention, the sources of the two transistor pairs M3, M4 and M5, M6 are connected via a respective capacitor C1 or, respectively, C2 to a respective output, respectively supplying a sequence of clock pulses, of the clock pulse generator TG. At the same time, the sources of the first transistor pair M3, M4 are connected by way of a first switching transistor M1 to the output AU, the sources of the second transistor M5, M6 are connected by way of the second switching transistor M2 to the output AU.

As a result of the cross-coupling of the two field effect transistors M4 and M5, a bistable flip-flop FF1 is formed. However, since their signal inputs given by means of the control electrodes of the transistors M3 and M6 are charged by the fixed supply potential V$_{CC}$ in the same manner as the drains of these transistors, the clock pulses which are inverted with respect to one another and which are supplied by way of the capacitors C1 and C2 are displaced by a fixed voltage V$_{CC}$ with respect to their level by means of the circuit, due to the fact that the capacitors C1 and C2 are charged to the voltage V$_{CC}$.

If, for example, the clock pulses supplied by the clock pulse generator TG are provided by means of the two levels 0 and 5 V, then the pulse level shifter IP1 transmits the pulses in the direction of the output AU and the two voltage doublers IV1 and IV2, whose levels are displaced by 5 V in the same direction.

The two pulse voltage doublers IV1 and IV2 are advantageously constructed as modified inverters which are designated as Bootstrap Inverters. As can be seen from FIG. 2, the pulse voltage doubler IV1 therefore contains the three field effect transistors M7, M8 and M9, as well as a capacitor C4. In the same manner, the second pulse voltage doubler IV2 contains the transistors M10, M11 and M12, as well as the capacitor C5.

Thereby, the transistors M7 and M10 are respectively connected as load resistors in that their control electrodes are directly connected to the drains of the transistor concerned. In the pulse voltage doubler IV1, the drain and the control electrode of the transistor M7 are directly connected at that output of the first pulse level shifter IP1 which is formed by the sources of the two transistors M3 and M4 and which is controlled by the first sequence of the clock pulses supplied by the clock pulse generator TG. In the second pulse voltage doubler IV2, the drain and the control electrode of the transistor M10 are connected with the output of the first pulse level shifter IP1 which is formed by the sources of the two transistors M5 and M6 and which is controlled by the second sequence of clock pulses.

In the first pulse voltage doubler IV1, the transistor M7 is connected, with its source, at the one electrode of the capacitor C4 and at the control electrode of the transistor M8. The drain of the transistor M8 is directly connected with the drain and the control electrode of the transistor M7, whereas its source is applied to the second electrode of the capacitor C4, on the one hand, and to the drain of the input transistor M9, on the other hand, and, finally, to the one input of the second pulse level shifter IP2 as the output of the pulse voltage doubler IV1.

The input transistor M9 of the first pulse voltage doubler is connected with its source to the zero potential and with its control electrode to the output of the clock pulse generator TG which supplies the second pulse sequence. Therefore, the first pulse voltage doubler is not controlled by means of the first, but rather by means of the second, sequence of clock pulses.

In the second pulse voltage doubler IV2, the source of the transistor M10 is connected at the one electrode of the capacitor C5 and in this manner forms the load resistor of the capacitor. Moreover, the source of the transistor M10 is connected to the control electrode of the transistor M11 whose drain is connected with the drain of the transistor M10 and whose source is connected with the second electrode of the capacitor C5 and with the drain of the input transistor M12 of the second pulse voltage doubler IV2. The source of the input transistor M12 is connected to zero potential, its control electrode lies at the output of the clock pulse generator TG which supplies the first sequence of clock pulses, which is, in turn, connected by way of the capacitor C1 to the sources of the transistors M3 and M4 of the first pulse level shifter IP1.

The second pulse level shifter IP2 likewise contains a bistable flip-flop FF2 which is formed by a pair of transistors M13 and M14 by means of cross-coupling. The drains of the two transistors M13 and M14 are connected to the supply potential $V_{CC}$, there control electrodes are connected to the source of the respective other transistor. Moreover, the source of the transistor M13 is connected, by way of the capacitor C6, to the output of the first pulse voltage doubler IV2, which is provided by means of a circuit connection between transistors M8 and M9, whereas the source of the transistor M14 is connected to the output of the second pulse voltage doubler, i.e. at a circuit point between the transistors M11 and M12. Finally, the source of the transistor M13 is connected to the control electrode of the transistor M1, i.e. of that transistor which connects the output AU with the sources of the transistors M3 and M4 of the first pulse level shifter IP1, i.e. with that combined clock pulse input/clock pulse output of the first pulse level shifter IP1 which is charged by means of the first sequence of clock pulses supplied by the clock pulse generator TG. On the other hand, the source of the transistor M14 is connected to the control electrode of the transistor M2, i.e. of that transistor which connects the output AU with the sources of the transistors M4 and M5, i.e. thus with that combined clock pulse input/clock pulse output of the first pulse level shifter IP1 which is controlled by means of the second sequence of clock pulses supplied by the clock pulse generator TG.

It should be pointed out that a respective transistor whose drain and control electrode are connected at a supply potential $V_{CC}$ can be connected in parallel to both the transistors M13 and M14 of the second pulse level shifter IP2. By doing so, the internal construction of the second pulse level shifter is then completely identical with that of the first pulse level shifter. It should be pointed out, moreover, that the output AU of the voltage converter is connected with the zero potential by way of a filter capacitor C3.

The circuit described above of the voltage converter is laid out in such a manner that the dc voltage $V_{DD}=2V_{CC}$, i.e. the double supply voltage appears at its output. This derives from the following behavior.

The first pulse sequence supplied by the clock pulse generator TG comprises digital pulses whose lower level lies at zero volt and whose upper level lies at p volt, for example, at 5 V. The same is true for the pulse sequence occurring at the second output of the clock pulse generator TG, which, however, is inverted with respect to the first pulse sequence. Sequences of clock pulses appear at the outputs of the first pulse level shifter IP1 which are synchronous with respect to the pulses supplied by the clock pulse generator TG but which, on the other hand, are displaced in the same direction by the same amount of potential, for example, by 5 V, so that these pulses now lie, for example, no longer between 0 and 5 V, but rather between 5 and 10 V.

Therefore, if the upper level of the clock pulses supplied from the clock pulse generator TG lies at pV, the lower level at 0 V, then the clock pulses appearing at the outputs of the first pulse level shifter IP1 lie between the levels U and p+U. The clock pulses appearing at the output of the first pulse voltage doubler IV1 receive the two levels 0 V and p+U V because of the circuit employed, i.e. 0 V and 10 V given the above numerical example, and correspond for the rest to the first sequence of clock pulses. Clock pulses with the same levels as the clock pulses at the output of the first pulse voltage doubler IV1 appear at the output of the second pulse voltage doubler IV2; these pulses, however, correspond to the second sequence of clock pulses and are accordingly inverted with respect to the pulses at the output of the circuit IV1.

The pulses appearing at the output of the second pulse level shifter IP2 have the levels U+2 p V, i.e. for example, 5 V and 15 V. The dc voltage $V_{DD}$ which can be tapped at the filter capacitor C3 is exactly twice the supply voltage $V_{CC}$.

The voltage converter described above with respect to FIGS. 1 and 2 can be combined with the further voltage converters of the same type in that the dc voltage $V_{DD}$ supplied thereby is employed as the supply voltage for the subsequently-connected voltage converter. Thereby, only one clock pulse generator TG is required. Details of this further embodiment will be described below on the basis of FIGS. 9 and 10.

The above-described voltage converter is only a voltage doubler. The same has the advantage, in contrast to the embodiment described in the German patent application P No. 26 32 199.3, that no threshold voltage falls off at the two transistors M1 and M2 and, therefore, exactly the full double supply voltage is available at the filter capacitor C3. To this end, the three-fold supply voltage is generated in the circuit of the two pulse level shifters IP1 and IP2 for the control electrodes of the transistors M1 and M2 in order to completely drive these transistors.

The voltage converter is conceived above all, for the operation of integrated MOS circuits, i.e. IC's constructed with the assistance of field effect transistors together with which it is respectively integrated on the same semiconductor chip. In such circuits, one often requires a higher operating voltage for their operation than is to be supplied to the semiconductor chip containing the circuit, or one requires a plurality of different operating voltages. To this end, the employment of a voltage converter of the type mentioned above is particularly favorable.

Further improvements of the voltage converter according to the invention can be achieved by means of the adaptation of the clock pulse generator TG to the voltage converter. A first further embodiment in this regard is now described in greater detail on the basis of FIGS. 3-5. In this embodiment of the invention, a digital oscillator O having a subsequently connected pre-amplifier V is employed as the clock pulse generator TG. In addition, a control loop RK is provided which operates upon the oscillator O or, respectively, upon the pre-amplifier V (in case its amplification is adjustable) or, respectively, upon the voltage converter SW illustrated in FIGS. 1 and 2 by way of a regulating unit. The actual value for the control loop RK is tapped at the output AU of the voltage converter SW and applied to the one input of a comparator K of the control loop RK which is realized by means of a differential amplifier by way of the voltage division point of a voltage divider comprising the "resistors" R1 and R2 which are realized by means of transistors and which are connected between the output AU and the zero potential. The index value generator SG comprises a series connection of the two "resistors" R3 and R4, likewise realized by means of transistors, which lie at the supply potential $V_{CC}$ on the one hand and at zero potential, on the other hand. The voltage division point between the "resistors" R3 and R4 lies at the other input of the comparator K.

The embodiment just described is illustrated in block diagram form in FIG. 3. A particularly favorable realization of the circuit is now to be described in greater detail on the basis of FIG. 4. Just like the embodiment of the voltage converter SW illustrated in FIG. 2, the voltage converter of FIG. 4 has the advantage that a uniform type of field effect transistor, namely, either n-channel transistors or p-channel transistors of the enhancement type are employed for construction of the circuit.

The oscillator O is designed as a RC oscillator and generates periodic oscillations which are supplied to the succeeding pre-amplifier V. At the pre-amplifier V, periodic trigger pulses for a third bistable flip-flop FF3 are provided by means of the oscillator oscillations, on the basis of which digital pulses appear which are transmitted, both directly as well as inverted, to the voltage converter SW.

As can be seen from FIG. 4, the oscillator O is a Schmitt trigger circuit having RC feedback. A MOS varactor capacitor C9 is connected to ground, i.e. at zero potential, on the one hand, and at the input of the Schmitt trigger, on the other hand, and serves as the feedback coupling capacitor. It should be pointed out that the dc voltage $V_{CC}$ to be doubled is also employed for the supply of the oscillator O, of the pre-amplifier V and of the control loop RK.

In addition to the aforementioned capacitor C9, the Schmitt trigger comprises five field effect transistors T1-T5. The one electrode of the feedback capacitor C9, connected to zero potential with the other electrode, is connected, on the one hand, to the control electrodes of the two transistors T3, T4 by way of the current conducting channel of the transistor T1. The current conducting channels of the transistors T2, T3 and T4 are connected in succession, whereby the drain of the transistor T2 is charged with the supply potential $V_{CC}$ and the source of the other outer transistor T4 of the series circuit is charged by means of the zero potential by way of the regulating unit of the control loop RK. A circuit point 4, lying between the regulating unit of the control loop, i.e. the transistor T1, and the transistor T4 forms the branching of a line which applies the zero potential to the pre-amplifier V, as well as to the two pulse voltage doublers IV1 and IV2 of the voltage converter SW, as can be seen from FIG. 4. The transistor T2 of the series connection of the transistors T2, T3 and T4, which is connected directly to the supply potential $V_{CC}$, is connected as a resistor in that its control electrode is also directly connected to the supply potential $V_{CC}$.

The transistor T1 which connects the aforementioned junction between the transistors T2 and T3 of the series connection with the varactor capacitor C9 and functioning as a feedback resistor is likewise connected to the supply potential $V_{CC}$ by way of its control electrode. Moreover, the two current conducting channels of the transistors T2 and T3 of the series connection which comprises the transistors T2, T3 and T4, and which is closer to the potential $V_{CC}$, are bridged by means of a transistor T5 whose control electrode likewise is connected to the aforementioned junction between the transistors T2 and T3 of the series connection of the transistors T2, T3 and T4. Finally, this junction also forms the one output 1 of the oscillator O, whose second output 4 is provided by means of the aforementioned branching between the transistors t1 and T4.

Figure 5:
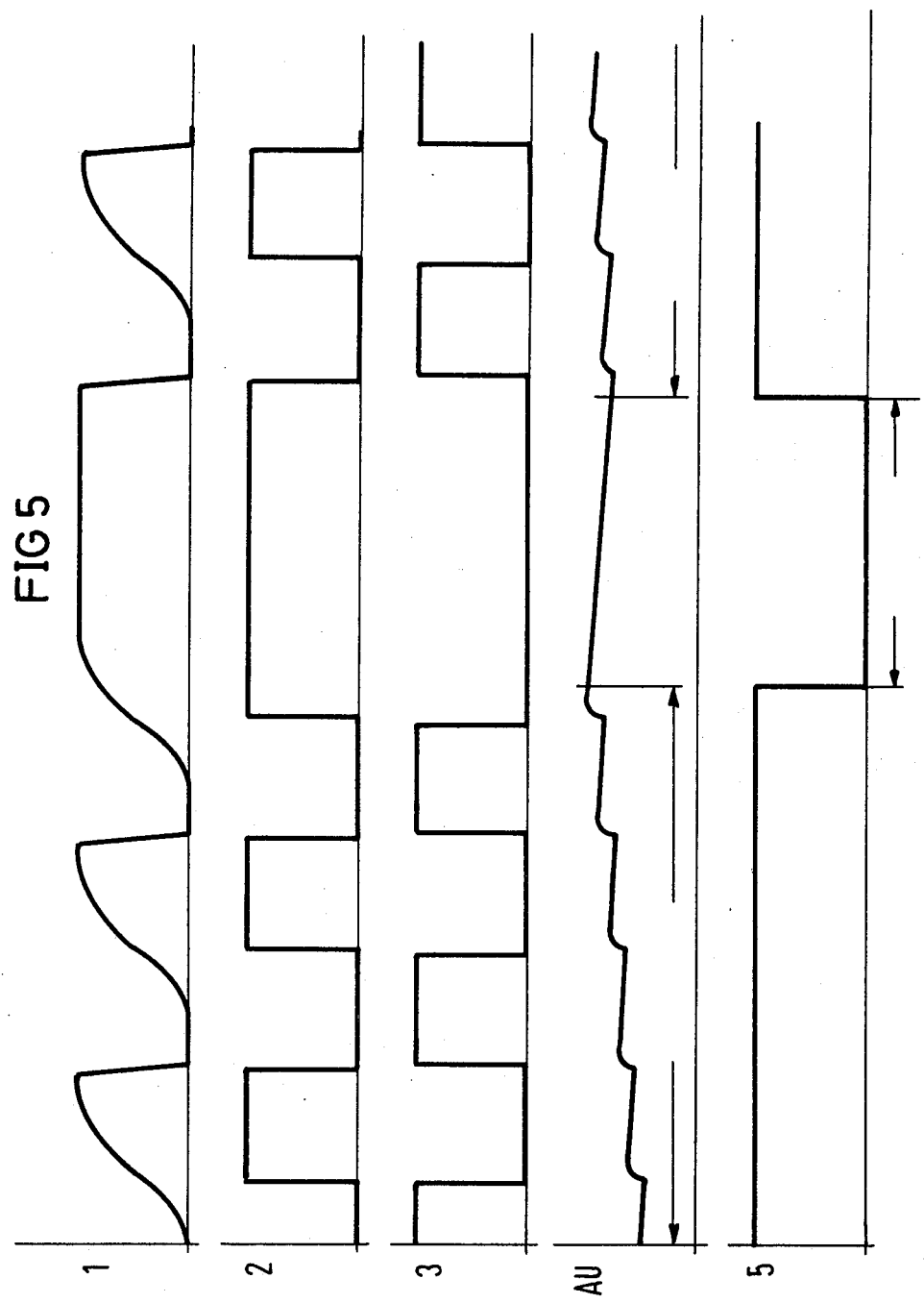
FIG. 5 is a pulse diagram pertaining to the circuit of FIG. 4.

The curve of the potential difference between the junction of the transistors T2 and T3, i.e. between the output 1 of the oscillator O and the zero potential is illustrated in the first diagram of FIG. 5, whereby the abscissa is the time t. The full amplitude has the level ($V_{CC}$-V), whereby V is the voltage drop at the transistor T2. When the oscillator O is disconnected from the zero potential by way of the regulating unit t1 of the control loop RK, then the voltage at the output 1 remains at the value ($V_{CC}$-V) and is maintained until the zero potential is again applied to the output 4 of the oscillator 0 by means of the regulating unit t1.

The oscillator signal appearing at the output 1 of the oscillator O and illustrated in the first diagram of FIG. 5, is now supplied both to an inverter IN provided in the amplifier V for the purpose of generating the inverse signal as well as, together with the inverted signal, to the actual amplifier in which the actual clock pulse sequences serving for the control of the voltage converter SW arrives. To this end, the junction between the two transistors T2 and T3 and the control electrode of the transistor T5 forming the output 1 of the oscillator O is, on the one hand, connected to the control electrode of the input transistor T8 of the inverter IN, then connected to the control electrode of the transistor T20 forming the signal input of a modified inverter and, finally, is connected to the control electrode of a transistor T16 forming a first signal input of a further bistable flip-flop FF3.

In addition to the input transistor T8, the inverter IN also contains the transistors T6 and T7 as well as a capacitor C10. The drains of the two transistors T6 and T7 are connected directly to the supply potential $V_{CC}$. The same is true for the control electrode of the transistor T6, so that the transistor T6 is connected as a resistor. The transistor T6 serves as a load resistor for the capacitor C10 whose one electrode is connected with the source of the transistor T6 as well as with a control electrode of the transistor T7 and whose second electrode is connected to the source of the transistor T7 and at the drain of the input transistor T8. Thereby, a junction is defined between the two transistors T7 and T8 which forms the output of the inverter IN and carries signals which are inverted with respect to the signals at the output 1 of the oscillator O. In order to achieve this, in addition to the circuit features just-described, the source of the input transistor T8 is connected to the output 4 of the oscillator O and, therefore, to the zero potential.

The output of the inverter IN is applied to the control electrode of the input transistor T11 of a first setting stage SE1 as well as to the control electrode of the transistor T13 forming the second clock pulse input of the aforementioned bistable flip-flop FF3.

The transistor T11 forms the input of a first setting stage SE1 for the RS flip-flop FF3. This setting stage, just like the inverter IN and the voltage doubler in the voltage converter SW, is a modified inverter and, in particular, a Bootstrap Inverter. The same is true for the second setting stage SE2 which is directly controlled by means of the output 1 of the oscillator O.

Accordingly, the first setting stage SE1 is constructed of the transistors T9, T10 and T11, as well as of the capacitor C11, and the second setting stage is constructed of the aforementioned transistor T20, the transistors T18 and T19 and the capacitor C12. Therefore, in detail, the following circuit is derived.

The input transistor T11 of the first setting stage SE1 has its source connected, as the transistor T8 of the inverter IN, to the zero potential. Moreover, the drain of the transistor T11 is connected to a branching point from which two branches extend to the supply potential $V_{CC}$. The one branch is provided by means of the transistor T10, while the other branch is provided by means of the series connection of the transistor T9 with the capacitor C11. Accordingly, the drains of the two transistors T9 and T10 are connected to the supply potential $V_{CC}$, and the source of the transistor T10 and one electrode of the capacitor C11 are connected to the branching points. Further, the second electrode of the capacitor C11 is connected both to the source of the transistor T9 and the control electrode of the transistor T10 and forms, in addition, the output of the first setting stage SE1. Finally, the control electrode of the transistor T9 is likewise connected to the supply potential $V_{CC}$, so that the transistor T9 is effective as a load resistor for the capacitor C11. The output of the first setting stage SE1 is connected with the control electrode of the one setting input of the bistable flip-flop FF3 formed by means of the transistor T12.

The second setting stage SE2, driven directly by means of the output 1 of the oscillator O and via the control electrode of the input transistor T20, moreover, is connected in a manner analogous to that of the setting stage SE1. Accordingly, the source of the transistor T20, like the input transistor T11 of the first setting stage SE1, is connected to zero potential, its drain is connected to a branching point from which two branches extend to the supply potential $V_{CC}$. The first branch is formed by means of the transistor T18 whose drain is connected to the potential $V_{CC}$. The second branch contains a transistor T19 which is connected as a resistor and whose drain and control electrode are therefore connected to the supply potential $V_{CC}$ and whose source is connected, on the one hand, with the control electrode of the transistor T18 and, on the other hand, with the one electrode of the capacitor C12. The second electrode of the capacitor C12 is connected to the source of the transistor T18 forming the first branch and, therefore, at the branching point. The output of the second setting stage SE2 is provided by a circuit point which lies between the transistor T19 and the capacitor C12 and which is connected with the control electrode of the transistor T17 forming the other setting input of the bistable flip-flop FF3.

The bistable flip-flop FF3, as pointed out above, is a RS flip-flop which is constructed of field effect transistors. It comprises two cross-coupled transistors T14 and T15, the transistors T13 or, respectively, T16 respectively connected in parallel to respective ones of the transistors T14 and T15, as well as a transistor T12 which is connected in series with the transistor pair T13, T14 and the transistor T17 which is connected in series with the transistor pair T15, T16 forming the setting inputs which lie at the supply potential $V_{CC}$. The pulse-supplying outputs 2 and 3 of the bistable flip-flop FF3 are provided by means of the drains of the two flip-flop transistors T14 and T15 which, in addition, are connected to the control electrode of the respective other of these transistors in order to effect a cross-coupling therebetween. Finally, the control electrode of the transistor T12 serving as a setting input and the control electrode of the transistor T17 serving as a setting input, as mentioned above, are connected to the output of the first setting stage SE1 and the output of the second setting stage SE2, respectively. The outputs 2 and 3 supply the two sequences of the sequences of clock pulses which are inverted with respect to one another and which serve for the charging of the voltage converter SW. Accordingly, the output 2 is connected by way of the capacitor C1 to the one input of the first pulse level shifter IP1 of the voltage converter SW and the output 3 is connected by way of the capacitor C2 to the other input of the first pulse level shifter IP1 of the voltage converter SW.

The voltage converter SW is designed as a voltage doubler and is illustrated in FIG. 4 in the same manner as in FIG. 2 so that further explanations of the circuit are unnecessary. With reference to the amplifier V which has been fully described, the following should be brought out.

By employing the doubly-set flip-flop FF3, i.e. by way of the setting stages SE1 and SE2, as well as the transistors T13 and T16, together with the oscillator O, a clock pulse generator TG is made available which produces sufficient output for the control of the voltage converter SW. Last, but not least, this is to be attributed to the two cross-coupled push-pull stages which form the flip-flop FF3. The pulses supplied from the oscillator O cause a pulse curve at the two outputs 2 and 3 of the amplifier V as can be seen from the second and third diagrams of FIG. 5. Therefore, two sequences of digital pulses, inverted with respect to one another, have been provided from the oscillations supplied from the oscillator O.

The last component of the arrangement illustrated in FIG. 4 is the control loop RK. The control loop RK contains a comparator K designed as a differential amplifier having one input which is charged by means of the dc voltage supplied from the output AU of the voltage converter SW as an actual value and a second input which is charged by means of the comparison voltage supplied from a reference value generator SG.

In the embodiment of the control loop RK which is illustrated in FIG. 4, there are 16 field effect transistors t1-t16, including the regulating unit t1, which are distributed among the functions of the comparator K, the reference value generator SG, the actual value supply and the push-pull stages forming the output of the control loop. The regulating unit t1 which is controlled by means of the push-pull stage, comprises the control electrode of the transistor t1 whose drain, as already mentioned, supplies the zero potential to the oscillator O and to the pre-amplifier V and, finally, also to the voltage doubler SW, whereas its source is connected directly at zero potential, i.e. at ground. By means of the effect of the control loop RK, the switch provided by the transistor t1 is switched on or off and, in this manner, the clock pulse supply by way of the amplifier V is controlled and the desired control is achieved. It should be pointed out at this time that the transistors of the control loop RK are all also designed as enhancement transistors of the same channel type as the remaining transistors of the circuit illustrated in FIG. 4.

The "resistors" referenced in FIG. 3 as elements R1 and R2 are provided, according to the realization illustrated in FIG. 4, by means of the two transistors t13 and t14 connected as resistors, whereby the drain of the transistor t13 and the control electrode thereof are connected to the output AU of the voltage doubler SW, whereby the source of the transistor t13 is connected to the drain and the control electrode of the transistor t14. A circuit point between the two transistors t13 and t14 supplies the actual value to be given to the comparator. Accordingly, it is connected to the control electorde of the transistor t11 of the comparator K forming the actual value input. The low end of the actual value generator, i.e. the source of the transistor t14 is connected to the zero potential by way of the transistor t15, connected as a diode, whose drain and control electrodes are connected to the source of the transistor t14 and to the source of the transistor t6 which belongs to the reference value generator SG.

The resistors of the reference value generator SG, referenced as elements R3 and R4 in FIG. 3, are provided in the embodiment according to FIG. 4 by means of the transistor t5 and the transistor t6 which are connected in series. Accordingly, the drain and the control electrode of the transistor t5 are connected to the supply potential $V_{CC}$, while the source is connected to the drain and the control electrode of the transistor t6, whereas the source of the transistor t6 is connected to the drain of the transistor t15, connected as a diode, and is connected to the zero potential in this manner, together with the actual value generator. The reference value generator is connected to the control electrode of the transistor t7 forming the second input of the comparator K with a circuit point lying between the two transistors t5 and t6.

The comparator K comprises two inverters connected in parallel and charged by means of a common power supply transistor t10. A first series connection, comprising the transistors t11 and t12 forms one of the inverters, while a second series connection comprising the transistor t7 and t9 forms the second inverter. Both inverters are connected with their low ends to the transistor t10. The transistors t9 and t12 are connected to the supply potential $V_{CC}$ with their drains and control electrodes, and, with their sources, lie at the drains of respective ones of the two input transistors t7 and t11 whose sources are connected in common to the drain of the power supply transistor t10.

In order to generate the reference voltage for the power supply transistor t10, a further series connection comprising two transistors, in particular the transistors 74 and t8 connected between the supply potential $V_{CC}$ and the zero potential, is provided in which the drain and the control electrode of the transistor t4 are connected to the supply potential $V_{CC}$, the source of the transistor t8 is connected to the zero potential and the control electrode of the transistor t8 is connected to the drain of the transistor t8. A voltage division point is provided between the two transistors t4 and T8 and is connected with the control electrode of the power supply transistor t10.

The one output of the comparator K lies between the transistor t11 and the transistor t12, while the other output lies between the transistor t7 and t9. For this reason, a respective circuit point between these transistor pairs is connected to the control electrode of respective ones of the transistor t2 and t3 which form the push-pull output stage of the control loop RK, as is readily apparent from FIG. 4. The two transistors t2 and t3 form a transfer lying between the supply potential $V_{CC}$ and the zero potential. To this end, the drain of the transistor t3, i.e. of the transistor controlled by means of the actual value side of the comparator, is connected to the supply potential $V_{CC}$, the source of the transistor t2, controlled by means of the reference value side of the comparator k, is connected to the zero potential, and a circuit point 5 between the two transistors t2 and t3 is connected to the control electrode of the transistor t1 which functions as a regulating unit. The potential at the circuit point 5, i.e. at the control electrode of the transistor t1, is illustrated in the last diagram of FIG. 5.

The effect of the arrangement illustrated in FIG. 4 can be seen in that the voltage curve illustrated in the last diagram of FIG. 5 occurs at the control electrode of the transistor t1, which voltage leads to the control behavior of the dc voltage $V_{DD}$ emitted at the output AU of the voltage converter SW and illustrated in the next-to-last line of FIG. 5. In particular, the following advantages are provided:

(a) The power consumption remains small, since the oscillator O, the amplifier V and the voltage doubler SW only become active when the generated voltage $V_{DD}$ falls below a predetermined, specific level;

(b) The generated voltage $V_{DD}$ is largely independent of the supply voltage $V_{CC}$ when the same is derived from a reference voltage which is independent of the supply voltage $V_{CC}$. In the exemplary embodiment illustrated in FIG. 4, the reference voltage delivered by the reference value generator SG is responsible, above all, for the value of the voltage $V_{DD}$; and (c) Threshold value voltages have no effect on the regulated voltage $V_{DD}$ apearing at the output AU because of the differential amplifier K.

In the exemplary embodiment illustrated in FIG. 4, the zero potential is supplied to the oscillator O, the amplifier V and the voltage converter SW by way of the regulating unit t1 of the control loop RK. If such a control loop is not provided, then these circuit parts lie directly at zero potential. Further, the voltage converter can be significantly simplified when, instead of employing its own oscillator O, oscillations are employed for the control of the amplifier V which are received from a different source. This is particularly true when the integrated semiconductor circuit, in particular a MOS circuit, to be supplied by means of the voltage converter, must be supplied for its operation with signal pulses delivered from the outside to which no particular information content is attached as auxiliary pulses. These auxiliary pulses can then be employed for the control of the pulse generating system PE whose output signals, in a manner analogous to the signals generated by the oscillator O, serve for charging the amplifier V.

The pulse generating system PE contains a number of monostable flip-flops which are driven by the various supply clock pulses of the integrated semiconductor circuit, or also by clock pulses newly arising within the integrated circuit to be supplied, as a result of its operation. This yields the advantage of a low power consumption, particularly upon use of a dynamic memory as the IC to be supplied, since the voltage is only boosted when the chip containing the integrated semiconductor circuit to be supplied is activated.

Figure 6:
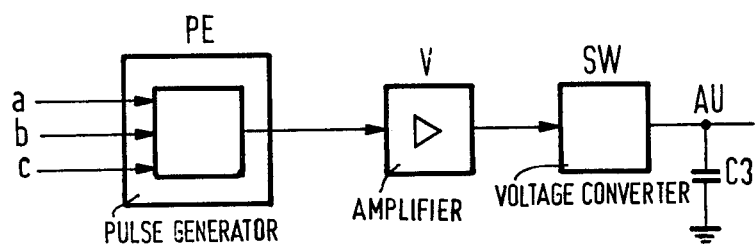
FIG. 6 is a schematic block diagram of a further embodiment of the invention.
Figure 8:
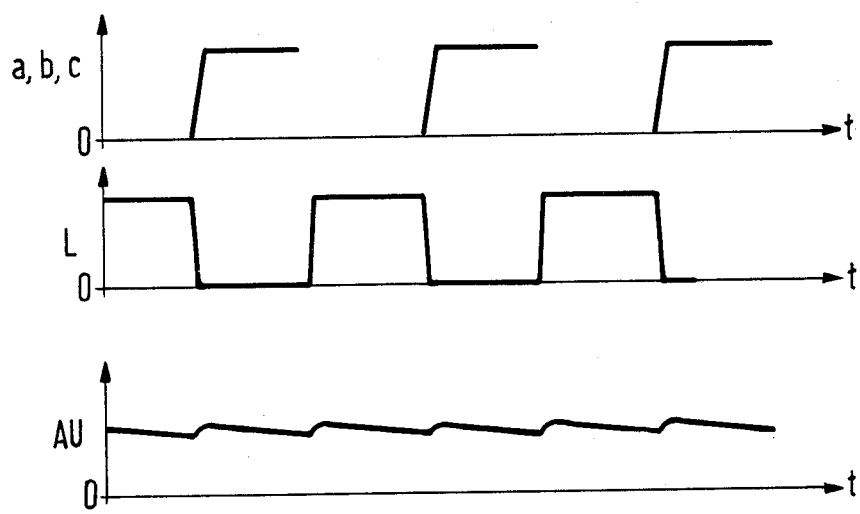
FIG. 8 is the pulse diagram pertaining to the structure of FIGS. 6 and 7.
Figure 7:
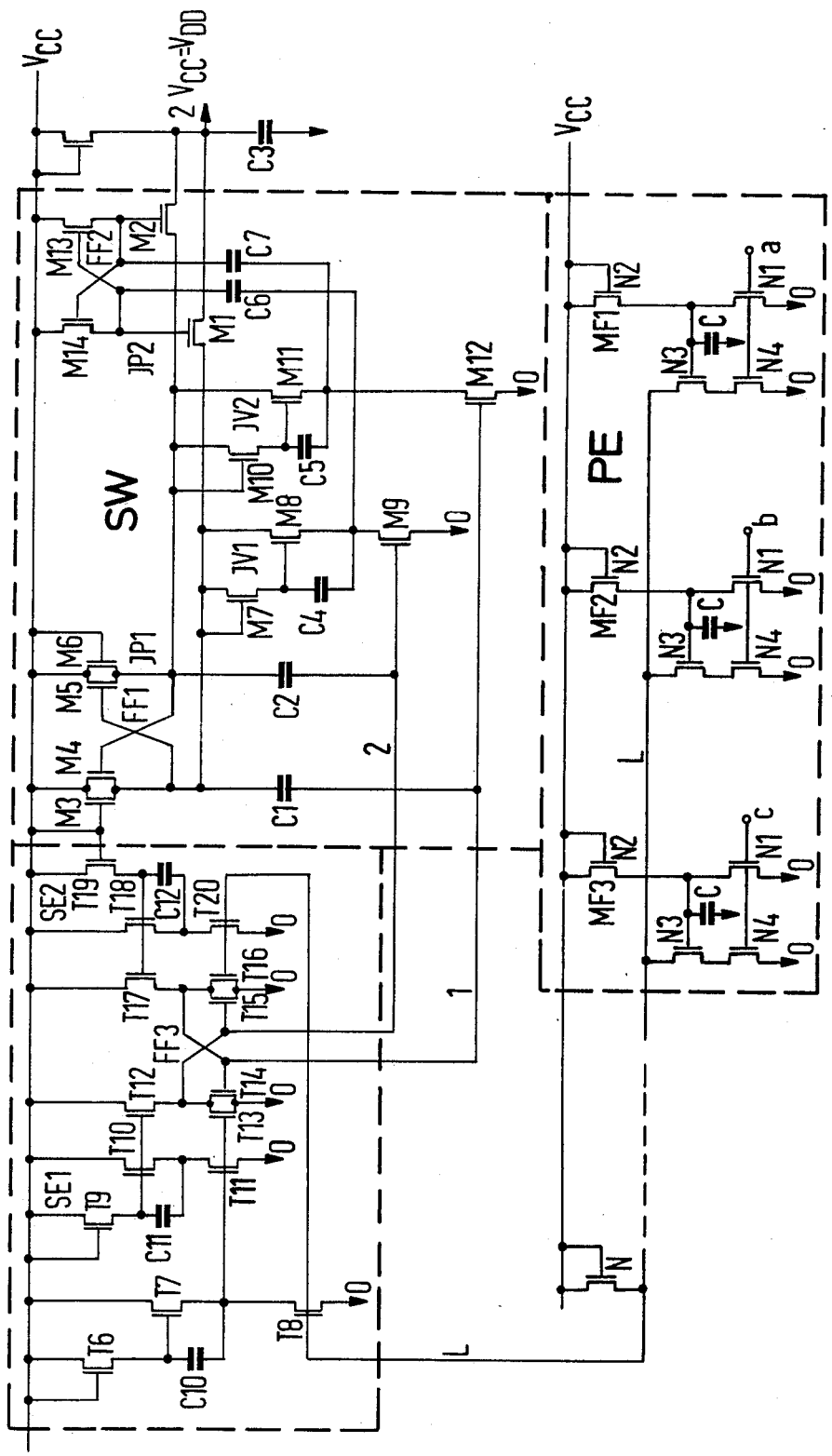
FIG. 7 is a schematic circuit diagram of the apparatus illustrated in FIG. 6.

The principle of a circuit suited for this purpose is illustrated in FIG. 6, with a detailed circuit diagram provided in FIG. 7 and the appertaining pulse diagram illustrated in FIG. 8.

Referring to FIG. 6, a system PE of monoflops is provided as a clock pulse generator TG which, for example, is charged by means of the auxiliary signals serving for the operation of the integrated semiconductor circuit to be supplied in that a respective type of these signals is applied to the input of the respective monoflops provided in the system PE. The system of monoflops again works upon the amplifier V, likewise belonging to the clock pulse generator TG, which amplifier, in turn, controls the voltage converter SW constructed according to FIG. 2, or, respectively, FIG. 4 in the manner described above, at the output of which voltage converter the dc voltage $V_{DD}$ serving for the supply voltage of the integrated semiconductor circuit then appears.

For example, in the case of auxiliary signals, it is a matter of the usual signals "RAS", "CAS", "WRITE" in the operation of dynamic MOS memories which are designed as rectangular pulses, for which, however, only one edge, for example the leading edge, has significance for that which follows. The system of monoflops then causes common line L leading from the outputs of the monoflops to the input of the amplifier V to be charged with a level which, because of the signal concerned, automatically flips from high to low and back again. The width of the pulse provided on the common line L and serving for the control of the amplifier V is determined by means of the internal properties of the individual monoflops, i.e. by means of their RC times. Preferably, the monoflops are identical to one another.

The circuit illustrated in FIG. 7 likewise employs only capacitors and field effect transistors of enhancement type with uniform channel conduction. The voltage converter SW, the preamplifier V and their connection to one another, as well as to the supply potential $V_{CC}$ effect no changes with respect to FIG. 4. Because of the absence of the oscillator O and the control loop RK, however, the preamplifier V and the voltage converter SW are directly connected to the zero potential.

The oscillator, as already mentioned in connection with FIG. 6, is replaced by means of a plurality of monoflops MF1, MF2, MF3 . . . each of which comprises four transistors N1, N2, N3 and N4, as well as a capacitor C. The input of the monoflop MF1 is the input a, the input of the monoflop MF2 is the input b, the input of the monoflop MF3 is the input c, etc.

The input of a respective monoflop is connected to the control electrodes of the transistors N1 and N4 whose sources are connected to the zero potential. The transistor N1 is connected in series with the transistor N2 whose drain and control electrodes are connected to the supply potential $V_{CC}$. The transistor N4 is connected in series with the transistor N3 whose control electrode is connected, by way of the capacitor C to the zero potential and its drain is connected to the line L leading to the input, i.e. to the transistors T8 and T20, of the amplifier V.

In addition to the individual monoflops MF1, MF2, MF3, . . . , a load resistor is provided by means of a transistor N which is connected between the supply potential $V_{CC}$ and the common line L.

In the arrangement illustrated in FIGS. 6 and 7, pulses are supplied to the amplifier V which are generated by the individual monoflops MF1, MF2, MF3 on the basis of excitations which are externally supplied to the respective inputs of the monoflops. The excitation signals can respectively derive from a source permanently allocated to the monoflop concerned. In addition, it is possible to activate the individual monoflop by means of signals which are obtained from various sources. The pulses supplied from the monoflops by way of the line L and ground are processed in the preamplifier V in the same manner as the signals of the oscillator O and are converted into two sequences of clock pulses of which one is inverted with respect to the other.

The pulse behavior of an installation according to FIGS. 6 and 7 is illustrated in FIG. 8. The first diagram illustrates the temporal sequence of the auxiliary pulses "RAS", "WRITE" and "CAS" employed in the operation of a dynamic MOS memory, which are applied to the inputs a, b, c . . . of the pulse generator PE, whereby only the leading edges of these auxiliary pulses are of significance. The monoflops MF1, MF2, MF3 . . . of the pulse generator PE are switched by such pulses so that the common line L is charged with a pulse sequence as is illustrated in the second diagram of FIG. 8. The third diagram illustrates the voltage $V_{DD}$ at the output AU of the voltage converter SW. When one of the clock pulses illustrated in the first diagram switches from low level to high level, the line L flips from the high level to the low level and back again. The width of this pulse is determined by the transistors N1 and the capacitors C. Therefore, the capacitors C2 and C3 of the voltage converter SW are always transferred to the filter capacitor C3 per leading edge of one of the input clock pulses according to the first diagram of FIG. 8.

It is possible to further develop the system according to FIGS. 1 and 2 in a direction to, above all, at doubling the supply voltage, such that any desired multiple of the supply voltage $V_{CC}$ appears at the output. In principle, this occurs in that the dc voltage appearing at the output of the voltage doubler SW is employed as the supply voltage "$V_{CC}$" for a subsequently-connected second voltage doubler SW' of the type described in connection with FIGS. 1 and 2. For this purpose, one can employ the same clock pulse generator TG for the clock pulse supply of the second voltage doubler SW' as for the first voltage doubler SW. On the other hand, however, one can also employ the clock pulse sequences emitted by the pulse voltage doublers IV1 and IV2 of the first voltage doubler SW for the clock pulse control of the subsequently-connected voltage converter SW'. The first possibility is illustrated in block diagram in FIG. 9, while the second situation is presented in FIG. 10.

The first voltage converter has the two pulse level shifters IP1 and IP2, the two pulse voltage doublers IV1 and IV2, and the two transistors M1 and M2 which lead to the output AU of the first voltage converter SW and controlled by means of the second pulse level shifter IP2. The circuit corresponds to that set forth in FIG. 1. The second voltage converter SW' comprises two pulse level shifters IP1' and IP2', two pulse voltage doublers IV1' and IV2', and two transistors M1' and M2' which lead to the output AU' of the second voltage converter SW' and controlled by means of the pulse level shifter IP2'. The output AU of the converter SW can be connected with the zero potential by means of a filter capacitor C3, while the output AU' can be connected with the zero potential by means of a filter capacitor C3'. The system has the clock pulse generator TG whose outputs are provided in the manner which can be seen from FIGS. 1 and 2 for the control of the first pulse level shifter IP1 and the two pulse voltage doublers IV1 and IV2 of the first voltage converter SW, as well as for the control of the first pulse level shifter IP1' and the two pulse voltage doublers IV1' and IV2' of the second voltage converter SW' in such a manner that the connection of the second voltage converter SW' to the clock pulse generator TG corresponds exactly to that of the first voltage converter SW. The only difference with respect to the connection of the two voltage converters SW and SW' can be seen in that, in the first voltage converter SW the first pulse level shifter IP1 is connected at the supply potential $V_{CC}$ and in the second voltage converter SW' the first pulse level shifter IP1' is connected at the output AU of the first voltage converter SW and, therefore, at twice the supply voltage, that is at the voltage $2V_{CC}$. The voltage $3V_{CC}$ appears at the output AU' of the second converter SW'.

In the arrangement illustrated in FIG. 10, the clock pulse generator TG is only connected to the first voltage converter SW, whereas the second voltage converter SW' receives its clock pulses from the outputs of the two pulse voltage doublers IV1 and IV2 of the first converter SW. Accordingly, the pulse level shifter IP1' of the second stage is connected, on the one hand, at the output AU of the first stage and, on the other hand, at the output of respective ones of the two pulse voltage doublers IV1 and IV2 with its two combined inputs and outputs. At the same time, the output of the pulse voltage doubler IV1, which for its part is controlled by means of the second clock pulse sequence of the pulse generator TG, is connected at the pulse voltage doubler IV1' of the second stage, which in turn is connected at the combined input/output of the first pulse level shifter IP1' of the second stage which is charged by means of the pulse voltage doubler IV2 of the first stage SW. The output of the pulse voltage doubler IV2 of the first stage SW, which for its part is controlled by means of the first clock pulse sequence of the pulse generator TG, is connected at the pulse voltage doubler IV2' of the second converter SW', which in turn is connected with that combined input/output of the first pulse level shifter IP1' of the second converter SW' which is charged by means of the output of the pulse voltage doubler IV1 controlled by means of the second clock pulse signal of the pulse generator TG. The dc voltage $4V_{CC}$ appears at the output AU' of the second converter stage SW'.

The arrangements illustrated in FIGS. 9 and 10 allow of and point to further embodiments. Therefore, for example, the clock pulse generator TG can be constructed in the manner illustrated in FIG. 4. It is then provided with a control loop which derives its actual value either from the output AU' of the second stage or from the output AU of the first stage. If necessary, two control loops can also be provided of which the one is effective at the first stage SW, while the other is effective at the second stage SW'. Finally, it is also possible to connect the second stages of the arrangements illustrated in FIG. 9 or, respectively, FIG. 10, to further voltage converter stages in the same manner which can be seen either in FIG. 9 or in FIG. 10 in order to be able to obtain still higher voltages than in the exemplary cases described above.

Although we have described our invention by reference to particular illustrative embodiments thereof, many changes and modifications of the invention may become readily apparent to those skilled in the art without departing from the spirit and scope of the invention. We therefore intend to include within the patent warranted hereon all such changes and modifications as may reasonably and properly be included within the scope of our contribution to the art.

We claim:

1. A clock-controlled d.c. converter, comprising:
   a pair of clock pulse inputs each adapted to receive clock pulse trains which are inverted with respect to one another;
   a first pulse level shifter including flip-flop comprising first, second, third and fourth field effect transistors each including a source, a drain and a control electrode,
   said sources and drains of said first and second field effect transistors respectively connected together, and said sources and drains of said third and fourth field effect transistors respectively connected together,
   said sources of said first and second field effect transistors and said sources of said third and fourth field effect transistors connected to respective ones of said pair of clock pulse inputs,
   said drains and said control electrodes of said first, second, third and fourth transistors connected to a supply potential,
   said sources of said first and second field effect transistors constituting a first output of said first pulse level shifter and said sources of said third and fourth field effect transistors constituting a second output of said first pulse level shifter, said first and second outputs carrying level shifted pulse trains which are inverted with respect to each other;

fifth and sixth field effect transistors each having a source-drain path connected to a respective output of said first pulse level shifter and connected to the source-drain path of the other constituting an output for said converter, and each having a control electrode, first and second voltage doublers each including first and second inputs and an output, said first input of said first voltage doubler connected to receive the inverted clock pulses and said second input of said first voltage doubler connected to said first output of said first pulse level shifter, said first input of said second voltage doubler connected to receive non-inverted clock pulses and said second input connected to said second output of said first pulse level shifter, said voltage doublers operable to supply double voltage clock pulses at their outputs;

a second pulse level shifter including a bistable flip-flop having first and second inputs connected to respective outputs of said voltage doublers, and first and second outputs connected to respective control electrodes of said fifth and sixth field effect transistors.

2. The converter of claim 1, comprising:
first and second capacitors;
and wherein said bistable flip-flop of said second pulse level shifter comprises:
seventh and eigth field effect transistors each including a source, a control electrode cross-connected to said source of the other and a drain connected to the supply potential,
said clock pulse inputs coupled via respective ones of said first and second capacitors to respective control electrodes of said seventh and eighth field effect transistors, and
said sources of said seventh and eighth field effect transistors connected to said control electrodes of respective ones of said fifth and sixth field effect transistors.

3. The converter of claim 1, wherein each of said voltage doublers is a modified inverter which comprises:
a ninth field effect transistor including a control electrode and a drain together connected to a respective output of said first pulse level shifter, and a source;
a third capacitor connected to said source;
a tenth field effect transistor including a control electrode connected to said source of said ninth transistor and to said capacitor, a drain connected to said control electrode and drain of said ninth transistor, and a source connected via said third capacitor to said source of said ninth transistor; and
an eleventh field effect transistor including a drain connected to said source of said tenth transistor, a source connected to ground potential, and a control electrode connected to a respective clock pulse input,
the clock pulse outputs of said voltage doublers formed by the respective junctions between said tenth and eleventh transistors in each of said voltage doublers.

4. The converter of claim 3, comprising:
a pulse generator including first and second outputs connected to respective ones of said clock pulse inputs, said generator producing respective identical pulse trains at said outputs; and
an inverter interposed between one of said first and second outputs and the respective clock pulse input for inverting the respective pulse train.

5. The converter of claim 4, comprising:
a fourth capacitor connected as a filter between said output of said converter and ground.

6. The converter of claim 1, comprising:
a clock pulse generator connected to said first and second clock pulse inputs, said clock pulse generator including an oscillator including a pair of outputs, an inverter connected to one of said outputs, and an amplifier including a pair of inputs connected to the other output of said oscillator and to said inverter, respectively, and a pair of outputs connected to respective ones of said clock pulse inputs.

7. The converter of claim 6, wherein said amplifier comprises:
a bistable flip-flop including a pair of inputs connected to receive the inverted and non-inverted pulses, respectively, and including said pair of outputs of said amplifier.

8. The converter of claim 7, wherein said oscillator is an RC oscillator.

9. The converter of claim 7, wherein said pulse generator, said first and second pulse level shifters and said first and second voltage doublers are integrated together on the same integrated circuit chip.

10. The converter of claim 7, wherein said bistable flip-flop is a RS flip-flop and said amplifier further comprises:
said inverter as a first inverter, and second and third inverters, said second inverter connected between said first inverter and one of said flip-flop inputs as a first setting stage for said flip-flop, and said third inverter connected between said other output of said oscillator as a second setting stage for said flip-flop.

11. The converter of claim 10, comprising:
twelfth, thirteenth and fourteenth field effect transistors each including a control electrode, a drain and a source; and
a fifth capacitor connected, on the one hand, to said source of said twelfth transistor and said control electrode of said thirteenth transistor, and, on the other hand, to said source of said thirteenth transistor and said drain of said fourteenth transistor,
said control electrode and said drain of said twelfth transistor connected to the supply potential,
said drain of said thirteenth transistor connected to the supply potential and said source of said fourteenth transistor connected to a reference potential,
said fourteenth transistor forming part of said first inverter and said control electrode of said fourteenth transistor connected to said oscillator and to said third inverter to constitute both of said inputs of said amplifier.

12. The converter of claim 11, wherein said source of said fourteenth transistor is connected to ground as the reference potential.

13. The converter of claim 11, wherein each of said setting stages comprises:
fifteenth, sixteenth and seventeenth field effect transistors each including a drain, a source and a control electrode; and
a sixth capacitor,
said source of said fifteenth transistor connected to the reference potential, said drain of said fifteenth transistor connected to said source of said sixteenth transistor and via said sixth capacitor to said control electrode of said sixteenth transistor and said source of said seventeeth transistor, said control electrode and said drain of said seventeenth transistor connected to the supply voltage, said drain of said sixteenth transistor connected to the supply voltage, and said control electrodes of said fifteenth and sixteenth transistors connected to the respective output from the respective setting stage to the respective input of said bistable flip-flop of said amplifier.

14. The converter of claim 13, wherein said bistable flip-flop of said amplifier comprises:

eighteenth, nineteenth, twentieth, twenty-first, twenty-second, and twenty-third field effect transistors each including a drain, a source and a control electrode, said drains of said eighteenth and twenty-first transistors connected to the supply voltage, said control electrodes of said eighteenth and twenty-first transistors connected to respective ones of said setting stages, said drains of said nineteenth and twentieth transistors connected to said source of said eighteenth transistor, said drains of said twenty-second and twenty-third transistors connected to said source of said twenty-first transistor, said control electrodes of said twentieth and twenty-second transistors cross-connected to said sources of each other, said sources of said nineteenth, twentieth, twenty-second and twenty-third transistors connected to the reference potential, and said control electrodes of said nineteenth and twenty-third transistors connected to said control electrodes of respective ones of said fifteenth transistors of said setting stages, said drains of said nineteenth and twentieth transistors and of said twenty-second and twenty-third transistors constituting respective outputs of said amplifier.

15. The converter of claim 14, wherein:

said oscillator comprises a Schmitt trigger circuit, including a RC feedback coupling, connected between the supply voltage and ground.

16. The converter of claim 15, wherein said oscillator comprises:

a seventh capacitor; and twenty-fourth, twenty-fifth, twenty-sixth, twenty-seventh and twenty-eighth field effect transistors each including a source, a drain and a control electrode, said drain-source circuits of said twenty-fourth, twenty-fifth and twenty-sixth transistors connected in series between the supply voltage and the reference potential, said control electrodes of said twenty-fourth and twenty-eighth transistors connected to the supply potential, the drain-source path of said twenty-eighth transistor connected in series with said seventh capacitor between the junction of said twenty-fourth and twenty-fifth transistors and ground, with the junction of said twenty-eighth transistor and said seventh capacitor connected to said control electrodes of said twenty-fifth and twenty-sixth transistors, said control electrode of said twenty-seventh transistor connected to the junction between said twenty-fourth and twenty-fifth transistors, which junction constitutes the output of said oscillator, and the drain-source circuit of said twenty-seventy transistor connected between the supply potential and the junction of said twenty-fifth and twenty-sixth transistors.

17. The converter of claim 16, comprising:

an actual value generator connector to said output of said converter and responsive to the output signal to generate a corresponding actual value signal.

18. The converter of claim 17, comprising:

a reference value control loop connected between said output of said converter and said oscillator for providing a reference potential as a function of the output signal.

19. The converter of claim 18, wherein said control loop comprises:

a comparator including an output connected to said oscillator, an actual value input, and a reference value input;

twenty-ninth, thirthieth and thirty-first field effect transistors each including a drain, a source and a control electrode, the drain-source circuits connected in series between said output of said converter and ground and each of said control electrodes connected to the respective drain so that the respective transistor operates as a resistor, the junction of said twenty-ninth and thirtieth transistors connected to said actual value input and the junction of said thirthieth and thirty-first transistors connected to said reference value input.

20. The converter of claim 19, wherein said reference value generator comprises:

said thirty-first transistor; and thirty-second and thirty-third field effect transistors each including a source, a drain and a control electrode, the drain-source circuits of said thirty-second, thirty-third and thirty-first transistors connected in series between the supply voltage and ground, and said control electrodes of said thirty-second and thirty-third transistors connected to the respective drains thereof with said drain and control electrode of said thirty-third transistor connected to said reference value input.

21. The converter of claim 20, wherein said comparator comprises:

thirty-fourth, thirty-fifth, thirty-sixth, thirty-seventh and thirty-eighth transistors each including a drain, a source and a control electrode, a reference branch including the drain-source circuits of said thirty-fourth and thirty-fifth transistors connected in series with the drain-source circuit of said thirty-eighth transistor between the supply potential and ground, said control electrode of said thirty-fourth transistor connected to the supply voltage and said control electrode of said thirty-fifth transistor constituting said reference value input, and an actual value branch including the drain-source circuits of said thirty-sixth and thirty-seventh transistors also connected in series with the drain-source circuit of said thirty-eighth transistor between the supply voltage and ground, said control electrode of said thirty-sixth transistor connected to the supply voltage and said control electrode of said thirty-seventh transistor constituting said actual value input, a voltage divider connected between the supply voltage and ground, and said control electrode of said thirty-eighth transistor connected to said voltage divider.

22. The converter of claim 21, comprising:

thirty-ninth, fourtieth and fourty-first transistors each including a drain, a source and a control electrode, the drain-source circuits of said thirty-ninth and fourtieth transistors connected in series between the supply voltage and ground with the control electrodes connected to respective junctions of said thirty-fourth and thirty-fifth transistors and said thirty-sixth and thirty-seventh transistors, the drain-source circuit of said fourty-first transistor connected between said source of said twenty-sixth transistor and ground, said control electrode of said fourty-first transistor connected to the junction of said thirty-ninth and fourtieth transistors, and said drain of said fourty-first transistor constituting a reference voltage output.

23. The converter of claim 22, wherein all of said field effect transistors are n-channel enhancement type transistors and said capacitors are metal-oxide semiconductor capacitors.

24. The converter of claim 22, wherein all of said field effect transistors are p-channel enhancement type transistors and said capacitors are metal-oxide semiconductor capacitors.

25. The converter of claim 1, comprising:

a pulse generator including an output connected to said clock pulse inputs, a plurality of inputs, and operable to provide timed output pulses in response pulses received at said inputs, said pulse generator further comprising a plurality of monoflops each including a respective one of said pulse inputs and each connected to said output of said pulse generator.

26. The converter of claim 25, wherein each of said monoflops comprises:

seventh, eighth, ninth and tenth field effect transistors each including a source, a drain and a control electrode; and a capacitor, the drain-source circuits of said seventh and eighth transistors connected in series between the supply voltage and ground, said control electrode of said seventh transistor connected to the supply voltage, said control electrodes of said eighth and tenth transistors constituting the respective pulse input, the drain-source circuits of said ninth and tenth transistors connected in series between said output and ground, and the junction of said seventh and eighth transistors and said control electrode of said ninth transistor connected to ground via said capacitor.

27. The converter of claim 26, comprising:

an eleventh field effect transistor including a drain and a control electrode commonly connected to the supply voltage, and a source connected to said output.

28. A clock-controlled d.c. converter, comprising:

a clock-pulse generator including first and second clock outputs and operable to provide respective clock pulses which are inverted with respect to each other;

first and second pulse level shifters each including first and second inputs and first and second outputs;

said first and second inputs of said first pulse level shifter respectively connected to said first and second clock outputs;

said first pulse level shifter connected between a supply voltage and a reference potential;

a converter output for providing a voltage which is twice the supply voltage;

switching means operable to connect said first and second outputs of said first pulse level shifter with said converter output and including first and second control inputs respectively connected to said first and second outputs of said second pulse level shifter;

first and second voltage doublers connected between the supply voltage and the reference potential and each including first and second inputs and an output, each of said voltage doublers operable to provide clock pulses at twice the voltage of the voltage supply, said first inputs respectively connected to said second and first clock outputs, said second inputs respectively connected to said first and second outputs of said first pulse level shifter, and said outputs respectively connected to said first and second inputs of said second pulse level shifter.

29. The converter of claim 28, further comprising:

an additional converter output for providing an output voltage which is three-times the supply voltage;

third and fourth pulse level shifters each including first and second inputs and first and second outputs;

said third pulse level shifter connected to and operating at twice the supply voltage which appears at the first-mentioned output;

said first and second inputs of said third pulse level shifter respectively connected to said first and second clock outputs;

additional switching means operable to connect said first and second outputs of said third pulse level shifter to said additional converter output and including first and second control inputs respectively connected to said first and second outputs of said fourth pulse level shifter; and third and fourth voltage doublers each including a first input respectively connected to said second and first clock outputs, a second input respectively connected to said first and second outputs of said third pulse level shifter, and an output respectively connected to said first and second inputs of said fourth pulse level shifter.

30. The converter of claim 28, further comprising:

an additional converter output for providing an output voltage which is four-times the supply voltage;

third and fourth pulse level shifters each including first and second inputs and first and second outputs;

said third pulse level shifter connected to and operating at twice the supply voltage which appears at the first-mentioned output;

said first and second inputs of said third pulse level shifter respectively connected to said outputs of said first and second voltage doublers;

additional switching means operable to connect said first and second outputs of said third pulse level shifter to said additional converter output and including first and second control inputs respectively connected to said first and second outputs of said fourth pulse level shifter; and third and fourth voltage doublers each including a first input respectively connected to said outputs of said first and second voltage doublers, a second input respectively connected to said first and second outputs of said third pulse level shifter, and an output respectively connected to said first and second inputs of said fourth pulse level shifter.

31. A clock-controlled d.c. converter, comprising:

a clock-pulse generator including first and second clock inputs for receiving respective clock pulses which are inverted with respect to each other;

first and second pulse level shifters each including first and second inputs and first and second outputs;

said first and second inputs of said first pulse level shifter respectively connected to said first and second clock inputs;

said first pulse level shifter connected between a supply voltage and a reference potential;

a converter output for prodicing a voltage which is twice the supply voltage;

switching means operable to connect said first and second outputs of said first pulse level shifter with said converter output and including first and second control inputs respectively connected to said first and second outputs of said second pulse level shifter;

first and second voltage doublers connected between the supply voltage and the reference and each including first and second inputs and an output, each of said voltage doublers operable to provide clock pulses at twice the voltage of the voltage supply, said first inputs respectively connected to said second and first clock inputs, said second inputs respectively connected to said first and second outputs of said first pulse level shifter, and said outputs respectively connected to said first and second inputs of said second pulse level shifter.

32. The converter of claim 31, wherein:

said first and second pulse level shifters are constructed as field effect transistor flip-flops including n-channel enhancement type field effect transistors.

33. The converter of claim 31, wherein:

said first and second pulse level shifters are constructed as field effect transistor flip-flops including n-channel enhancement type field effect transistors.

* * * * *